US012641540B2

(12) United States Patent
Zhang et al.

(10) Patent No.: US 12,641,540 B2
(45) Date of Patent: May 26, 2026

(54) METHOD AND APPARATUS FOR MONITORING PHYSICAL DOWNLINK CONTROL CHANNELS

(71) Applicant: Lenovo (Beijing) Limited, Beijing (CN)

(72) Inventors: Yuantao Zhang, Beijing (CN); Hongmei Liu, Beijing (CN); Zhi Yan, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 349 days.

(21) Appl. No.: 18/260,507

(22) PCT Filed: Jan. 8, 2021

(86) PCT No.: PCT/CN2021/070886
§ 371 (c)(1),
(2) Date: Jul. 6, 2023

(87) PCT Pub. No.: WO2022/147770
PCT Pub. Date: Jul. 14, 2022

(65) Prior Publication Data
US 2024/0080767 A1 Mar. 7, 2024

(51) Int. Cl.
*H04W 76/28* (2018.01)
*H04L 67/131* (2022.01)
*H04W 52/02* (2009.01)

(52) U.S. Cl.
CPC .............................. *H04W 52/0229* (2013.01)

(58) Field of Classification Search
CPC ............. H04W 52/0229; H04L 5/0094; H04L 5/0053; Y02D 30/70
See application file for complete search history.

(56) References Cited

U.S. PATENT DOCUMENTS

2020/0351682 A1* 11/2020 Cirik ..................... H04W 76/28
2021/0144798 A1* 5/2021 Jiang ..................... H04W 76/28
(Continued)

FOREIGN PATENT DOCUMENTS

| CN | 110740025 A | 1/2020 |
| CN | 110876185 A | 3/2020 |
| CN | 111566981 A | 8/2020 |
| WO | 2020069135 A2 | 4/2020 |

OTHER PUBLICATIONS

3GPP TSG RAN WG1 Meeting #94bis; R1-1810976; Source: OPPO; Title: UE adaptation to the traffic for UE power saving; Chengdu, China, Oct. 8-12, 2018. (Year: 2018).*
(Continued)

*Primary Examiner* — Mohammed S Chowdhury
(74) *Attorney, Agent, or Firm* — FIG. 1 Patents

(57) ABSTRACT

A method and an apparatus for monitoring physical downlink control channels (PDCCHs) are provided. The method may be performed by a UE. The method includes receiving a plurality of first configuration sets respectively associated with a plurality of first search space sets; receiving a first indication indicating a group index; and performing PDCCH monitoring in the first search space sets based on a first group configuration indicated by the first indication. Each first configuration set includes a first common configuration and at least one first group configuration.

20 Claims, 10 Drawing Sheets

(56) References Cited

U.S. PATENT DOCUMENTS

| | | | | |
|---|---|---|---|---|
| 2022/0338178 A1* | 10/2022 | Kuang | .............. | H04W 52/0229 |
| 2022/0345922 A1* | 10/2022 | Guo | .................. | H04W 52/0216 |
| 2023/0047156 A1* | 2/2023 | Lin | ........................ | H04L 5/0053 |
| 2023/0163930 A1* | 5/2023 | Cirik | ..................... | H04L 5/0092 |
| | | | | 370/329 |
| 2023/0292244 A1* | 9/2023 | Ohara | ................... | H04W 52/02 |
| 2023/0403721 A1* | 12/2023 | Zhou | ................ | H04W 52/0258 |

OTHER PUBLICATIONS

3GPP TSG RAN WG1 #101; R1-2003489; Source: ZTE; Title: Views on power saving enhancement e-Meeting, May 25-Jun. 5, 2020 (Year: 2020).*

3GPP TSG RAN WG1#101-e; R1-2005011; Source: Moderator (Lenovo); Title: Summary #2 of email discussion [101-e-NR-unlic-NRU-DL_Signals_and_Channels-01] on Search Space; e-Meeting, May 25-Jun. 5, 2020 (Year: 2020).*

3GPP TSG RAN WG1 Meeting #101-e; R1-2003518; Source: Huawei, HiSilicon; Title: Remaining issues on PDCCH based power saving; E-meeting, May 25-Jun. 5, 2020 (Year: 2020).*

PCT/CN2021/070886 , "International Preliminary Report on Patentability", PCT Application No. PCT/CN2021/070886, Jul. 20, 2023, 6 pages.

PCT/CN2021/070886 , "International Search Report and Written Opinion", PCT Application No. PCT/CN2021/070886, Sep. 26, 2021, 7 pages.

* cited by examiner

900 receiving a plurality of first configuration sets respectively associated with a plurality of first search space sets — 901 receiving a first indication indicating a group index — 903 performing PDCCH monitoring in the first search space sets based on a first group configuration indicated by the first indication — 905

1000 transmitting a plurality of first configuration sets respectively associated with a plurality of first search space sets ~1001 transmitting a first indication indicating a group index ~1003

METHOD AND APPARATUS FOR MONITORING PHYSICAL DOWNLINK CONTROL CHANNELS

TECHNICAL FIELD

Embodiments of the present disclosure generally relate to wireless communication technology, especially to a method and apparatus for discontinuous reception (DRX).

BACKGROUND

For radio resource control (RRC) connected user equipment (UE) in 5G new radio (NR), a network (e.g., a NodeB) might configure discontinuous reception (DRX) for the purpose of UE side power saving. When DRX is configured, the UE does not need to continuously monitor PDCCH but waits for an on-duration of the DRX cycle and may start to monitor PDCCH during the on-duration. If a PDCCH for the UE is detected during the on-duration, the UE may start a drx-inactivity timer. During the period in which the drx-inactivity timer has yet to expire, the UE may continuously monitor the PDCCH. In other words, the UE enters active time when the drx-inactivity timer is running. When the drx-inactivity timer expires, the UE stops the PDCCH monitoring and enters sleep mode.

Since low power consumption and low data transmission latency is critical in 5G NR, power saving and data transmission latency under DRX retransmission become an important issue to be considered.

SUMMARY OF THE APPLICATION

Some embodiments of the present disclosure provide at least a technical solution for discontinuous reception implemented between a UE and a NodeB.

Some embodiments of the present disclosure provide a method for monitoring physical downlink control channels (PDCCHs). The method may be performed by a user equipment (UE). The method comprises: receiving a plurality of first configuration sets respectively associated with a plurality of first search space sets; receiving a first indication indicating a group index; and performing PDCCH monitoring in the first search space sets based on a first group configuration indicated by the first indication. Each first configuration set includes a first common configuration and at least one first group configuration Some other embodiments of the present disclosure provide a method performed by a NodeB. The method comprises: transmitting a plurality of first configuration sets respectively associated with a plurality of first search space sets; and transmitting a first indication indicating a group index. Each first configuration set includes a first common configuration and at least one first group configuration.

Some embodiments of the present disclosure also provide an apparatus, including at least one non-transitory computer-readable medium having computer executable instructions stored thereon, at least one receiver, at least one transmitter, and at least one processor coupled to the at least one non-transitory computer-readable medium, the at least one receiver, and the at least one transmitter. The computer executable instructions are programmed to implement any method as described in the present disclosure, with the at least one receiver, the at least one transmitter, and the at least one processor.

Embodiments of the present disclosure provide a technical solution for discontinuous reception. Accordingly, embodiments of the present disclosure can enhance power saving at the UE side and provide low data latency.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G New Radio (NR), 3GPP long-term evolution (LTE) Release 8 and so on. Persons skilled in the art know very well that, with the development of network architecture and new service scenarios, the embodiments in the present disclosure are also applicable to other similar technical problems.

Figure 1:
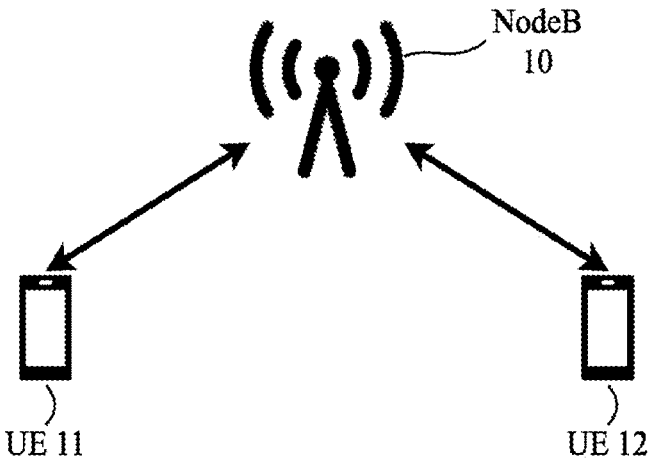
FIG. 1 is a schematic diagram illustrating an exemplary wireless communication system according to some embodiments of the present disclosure.

FIG. 1 is a schematic diagram illustrating an exemplary wireless communication system according to some embodiments of the present disclosure.

FIG. 1 shows communications between UEs and a NodeB. FIG. 1 shows the NodeB 10 and the UEs 11 and 12 for illustrative purpose. The UEs 11 and 12 may be under the coverage of the NodeB 10. As shown in FIG. 1, the NodeB 10 is in communication with the UE 11. The NodeB 10 is in communication with the UE 12. In some embodiments, the UEs 11 and 12 may be RRC connected with the NodeB 10. The UEs 11 and 12 may be connected with the NodeB 10 on the RRC layer. The NodeB 10 may transmit data blocks or data packets to the UEs 11 and 12. The NodeB 10 may transmit data blocks or data packets to the UEs 11 and 12 in resource blocks.

For example, the wireless communication system in FIG. 1 may be compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G NR network, a satellite communications network, a high altitude platform network, and/or other communications networks.

In some embodiments, the NodeB 10 may be referred to as a base station, a base unit, a base, an access point, an access terminal, a macro cell, an enhanced Node B (eNB), a gNB, a Home Node-B, a relay node, a device, a remote unit, or by other terminology used in the art. A NodeB may be distributed over a geographic region. Generally, a NodeB is a part of a radio access network that may include one or more controllers communicably coupled to one or more corresponding base stations.

The UEs 11 and 12 may include computing devices such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 11 and 12 may include a portable wireless communication device, a smart phone, a cellular telephone, a flip phone, a device having a subscriber identity module, a personal computer, a selective call receiver, or any other device capable of sending and receiving communication signals on a wireless network. In some embodiments, the UEs 11 and 12 may include wearable devices, such as smart watches, fitness bands, optical head-mounted displays, or the like. Moreover, the UEs 11 and 12 may be referred to as a subscriber unit, a mobile, a mobile station, a user, a terminal, a mobile terminal, a wireless terminal, a fixed terminal, a subscriber station, a user terminal, or a device, or described with other terminology used in the art.

When the NodeB 10 transmits data packets in downlink (e.g., to the RRC connected UEs 11 and 12). Before data transmission in downlink, the NodeB 10 may use a physical downlink control channel (PDCCH) to notify the corresponding UE such that the UE may receive data transmission on the corresponding channel.

Figure 2:
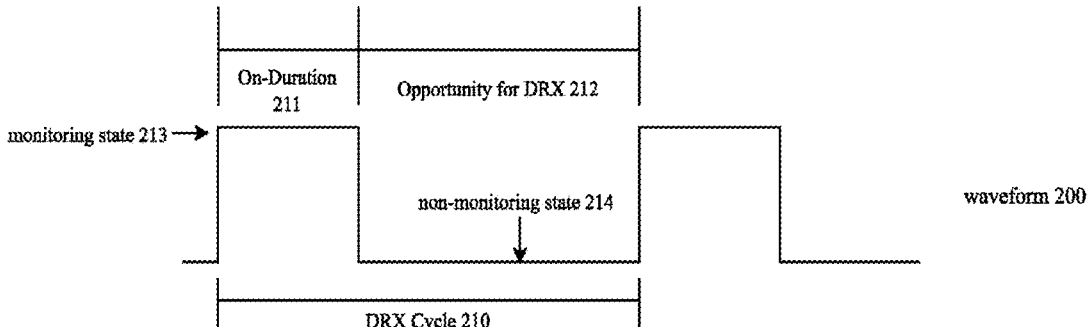
FIG. 2 is a schematic diagram illustrating DRX cycles according to some embodiments of the present disclosure.

FIG. 2 is a schematic diagram illustrating DRX cycles according to some embodiments of the present disclosure. For the purpose of saving power at the UE side (e.g., UEs 11 and 12), the NodeB 10 may apply discontinuous reception (DRX). The waveform 200 in FIG. 2 may include multiple DRX cycles 210. One DRX cycle 210 may include an on-duration 211 and an opportunity for DRX 212. DRX cycles 210 may be periodic repetitions of on-duration 211 followed by opportunities for DRX 212 (e.g., inactivity periods). The high state of the waveform 200 in an on-duration 211 may indicate a monitoring state 213 in which a drx-inactivity timer may be activated. The low state of the waveform 200 in an opportunity for DRX 212 may indicate a non-monitoring state 214 in which a drx-inactivity timer cannot be activated.

It may be assumed that DRX is applied between the NodeB 10 and the UE 11. The UE 11 does not need to continuously monitor the PDCCH, but the UE 11 may wait for an on-duration 201 of a DRX cycle 201 and wake up to monitor PDCCH. Referring to FIG. 2, the UE 11 may monitor the PDCCH in the on-duration 213. The UE 11 may stop monitoring the PDCCH in the opportunity for DRX 212. The monitoring state 213 of the waveform 200 in an on-duration 211 may indicate that the UE 11 is monitoring the PDCCH. The non-monitoring state 213 of the waveform 200 in an opportunity for DRX 212 may indicate that the UE 11 stop monitoring the PDCCH.

During the on duration 211, if the UE 11 detects data, aimed at itself, on the PDCCH, the UE 11 may activate a drx-inactivity timer. When the drx-inactivity timer is activated, the UE enters active time. During the period in which the drx-inactivity timer is activated, the UE is on active time. During the period in which the drx-inactivity timer is activated, the UE may continuously monitor the PDCCH. When the drx-inactivity timer expires or deactivates, the UE may stop monitoring the PDCCH monitoring and enter sleep mode.

5G NR may support a Downlink Control Information (DCI)-based Wake Up Signal (WUS). The WUS may be transmitted before each DRX on-duration. The WUS may indicate whether the UE is requested to wake up and monitor the PDCCH in the subsequent on-duration. If the WUS indicates that the UE is no need to wake up, the UE may enter sleep mode in the subsequent on-duration.

Figure 3:
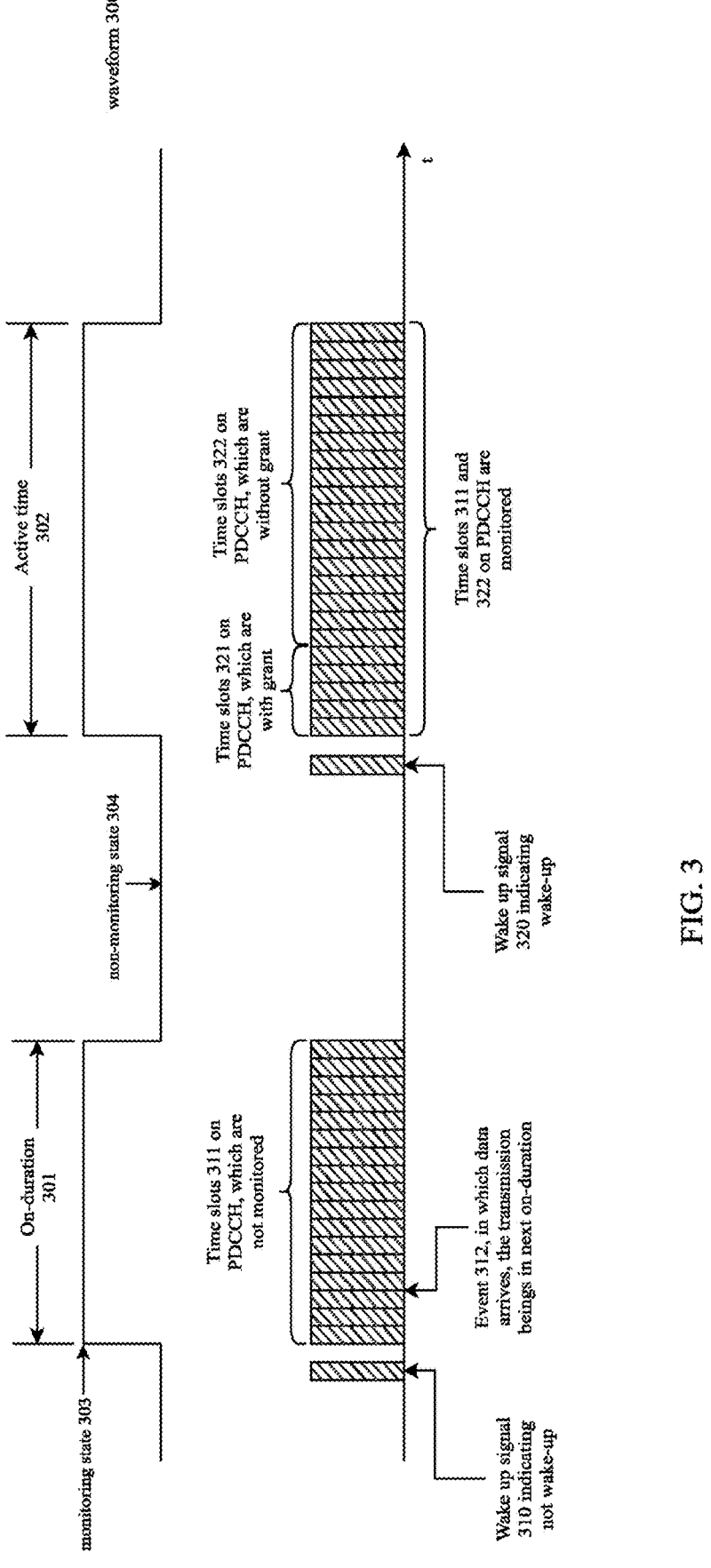
FIG. 3 is a schematic diagram illustrating a DRX scheme according to some embodiments of the present disclosure.

FIG. 3 is a schematic diagram illustrating an exemplary DRX scheme supporting DCI-based WUS according to some embodiments of the present disclosure. Persons skilled in the art can understand that the DRX may be applied between the NodeB 10 and any one of the UEs 11 and 12. For simplicity of explanation, it is assumed hereinafter that DRX is applied between the NodeB 10 and the UE 11.

The waveform 300 in FIG. 3 includes an on-duration 301 and an active time 302. The high state of the waveform 300 in an on-duration 301 or an active time 302 may indicate a monitoring state 303. The low state of the waveform 300 may indicate a non-monitoring state 304.

Referring to FIG. 3, a WUS 310 is received or transmitted before the on-duration 301. The WUS 310 may indicate that the UE 11 does not have to wake up, and the UE 11 may stop or omit monitoring of the PDCCH during the on-duration 301.

In FIG. 3, an event 312 may occur during the on-duration 301. The event 312 may indicate arrival of data packets aimed at the UE 11 arrive. In the embodiment of FIG. 3, since the UE 11 is not woken up during the on-duration 301, the UE 11 may not receive the data packets of the event 312, such that the UE 11 may be required to await the next on-duration for data scheduling.

It can be seen that, the embodiment of FIG. 3 may further reduce the PDCCH monitoring effort since the WUS is applied. However, since data traffic may occur in bursts, data packets may arrive during an omitted on-duration (e.g., the on-duration 301). In such a case, the UE 11 must wait for the next on-duration for the data scheduling. This may increase data transmission latency.

Please refer to FIG. 3 again. Since the data packets targeted for the UE 11 have to be transmitted, the NodeB 10 may transmit a WUS 320 before the next on-duration. The WUS 320 may indicate that the UE 11 is requested to wake up. Since the UE 11 receives the WUS 320 transmitted by the NodeB 10, the UE 11 may enter active time 302. Because the UE 11 enters the active time 302, the UE 11 may monitor the PDCCH during the active time 302.

The time slots 321 on the PDCCH may be with grant, and the NodeB 10 may schedule the time slots 321 for the UE 11. For example, the NodeB 10 may use the time slots 321 to transmit control information to schedule the data transmission for the UE 11. The time slot 322 on the PDCCH may be without grant, and the NodeB 10 may not schedule the time slot 322 for the UE 11. However, even though the time slots 322 on the PDCCH during the active time 302 may not be scheduled for the UE 11 (since they are without grant), the UE 11 still has to monitor the PDCCH for the entire active time 302. In other words, data scheduling for the UE 11 may only occur in time slots 321. After the time slots 321, there is no scheduling for the UE 11 in the time slots 322. However, the UE 11 still has to monitor the PDCCH continuously until the expiry of the active time 302.

That is, unnecessary PDCCH monitoring can take place during the active time 302. Especially considering that the drx-inactivity timer may be longer in realistic network configuration, the unnecessary PDCCH monitoring during the active time 302 may increase. The UE 11 may have to monitor the PDCCH even in the absence of scheduling for the UE 11 in the active time 302.

The PDCCH may be monitored in the configured search space sets (e.g., the configured resource blocks). A search space set may be configured to be associated with a control resource set (CORESET). A CORESET may define the time (number of OFDM symbols) and frequency resources to be monitored on the PDCCH. There may be two types of search space sets: common search space sets (CSS) and UE specific search space sets (USS). The CSS may mostly be shared between the UEs and may be configured either in system information or UE specific signalling. The USS may be independently configured for each UE. Up to 10 search space sets, including common search space sets and UE specific search space sets, may be configured for a UE in each bandwidth part. The configuration fields of a search space set and the description of each field are shown in Table 1.

To reduce PDCCH monitoring effort at the UE side and keep scheduling latency low, the present disclosure provides that, for a set of associated search space sets, the UE may uniformly switch the search space sets from one group configuration to another group configuration. Different group configurations for each search space set may correspond to different PDCCH monitoring efforts.

Multiple group configurations may be configured for each search space set in a plurality of search space sets. Each of the group configurations may have a different group index. Each group configuration may include values of some configuration fields for the search space set. The configuration fields of a group configuration may influence PDCCH monitoring efforts. The values of the other configuration fields (the configuration fields which are not included in the group configurations) remain the same during the switching. In some embodiments, the UE may have a number of group configurations for each search space set in a search space set group; the UE may monitor the PDCCH in a group search space set using the values of the configuration fields of the first group configuration for each search space set at the first timing; and the UE may monitor the PDCCH in the same group of search space sets using the values of the configuration fields of the second group configuration for each search space set at the second timing. The group configurations adopted by the UE for the same group of search space sets are uniformly switched from the first group configurations to the second group configurations.

The search space sets in the same set (or group) may have uniform switching behavior. Exemplary sets (or groups) of search space sets having uniform switching behavior may be provided in the present disclosure.

In one embodiment, all the UE specific search space sets (may or may not associated with same CORESET) may have the same switching behavior. In other words, switching between group configurations may be performed for all the UE specific search space sets at the same time.

In another embodiment, all the common search space sets may have the same switching behavior (may or may not associated with same CORESET). In other words, switching between group configurations may be performed for all the common search space sets at the same time. The common search space sets on which the group configurations can be switched may be the common search space sets which is UE-specifically configured. In other words, if the common

TABLE 1

| Field | Description |
| --- | --- |
| searchSpaceId | Search space ID |
| controlResourceSetId | Associated CORESET ID |
| monitoringSlotPeriodicityAndOffset (e.g., period) | Slots for PDCCH Monitoring configured as periodicity and offset |
| duration (e.g., length) | Number of consecutive slots in each PDCCH monitoring periodicity |
| monitoringSymbolsWithinSlot | Starting OFDM symbols for PDCCH monitoring in the slots configured for PDCCH monitoring |
| nrofCandidates | Number of candidates per aggregation level (0, 1, 2, 3, 4, 5, 6, 8) |
| searchSpaceType | Indicates whether this is a common search space (shared between UEs) or a UE specific search space (UE-independently, or shared between some specific UEs) |

The present disclosure provides schemes to reduce PDCCH monitoring effort during active time and reduce scheduling latency for the arrived data packets.

search space sets can be configured for a UE, switching between group configurations may be performed on common search space sets.

In another embodiment, all the UE specific search space sets and the common search space sets, which may be configured by a UE, may have the same switching behavior. In other words, switching between group configurations may be performed for all the UE specific search space sets and all the common search space sets (which may be configured for a UE in a UE specific manner) at the same time.

In another embodiment, the search space sets that are associated with the same CORESET may have the same switching behavior. In other words, switching between group configurations may be performed for all the search space sets associated with the same CORESET at the same time.

In yet another embodiment, the search space sets of the same CORESET pool have the same switching behavior. In other words, switching between group configurations may be performed for all the search space sets of the same CORESET pool at the same time.

In yet another embodiment, the search space sets that have the same switching behavior are configured by the network (e.g. a NodeB). In other words, switching between group configurations may be performed for a group of search space sets which is assigned by the network. In some embodiments, the network may configure an index for a plurality of search space sets. The search space sets that are configured with the same index have the same switching behavior. In another embodiments, the network may configure a number of CORESETs and the search space sets associated with these CORESETs have the same switching behavior.

In some embodiments, the configuration fields for a search space set may be divided into two groups: common fields and group-specific fields. Table 2 provides one example of the common fields and group-specific fields divided from the configuration fields for a search space set. The group specific fields may contain the fields relevant to the PDCCH monitoring effort, including the fields regarding monitoring periodicity, monitoring duration and the number of monitoring candidates. The fields in the group-specific fields may be more relevant to saving power for a UE. The fields in the common fields may be less relevant to saving power for a UE.

TABLE 2

| Field type | Field |
|---|---|
| Common fields | searchSpaceId |
| | controlResourceSetId |
| | monitoringSymbolsWithinSlot |
| | searchSpaceType |
| Group-specific fields | monitoringSlotPeriodicityAndOffset |
| | duration |
| | nrofCandidates |

The common configuration may include the values of the common fields. One group configuration may include the values of the group specific fields. A set of the values for the common fields may be named as a common configuration, and a set of the values for a set of group-specific configuration fields may be named as a group configuration. In each time unit, e.g., a predetermine number of slots, the common configuration and only one group configuration are adopted (or applied) for monitoring the PDCCH in a search space set. The common configurations for a search space set may remain the same during switching between two the group configurations.

In some embodiments, one field may be listed in both the common fields (e.g., the common configuration) and group specific fields (e.g., a group configuration). If both of the common configuration and the group configuration provide values for the same field, the group configuration may override the common configuration, and the value in the group configuration provided for same field may be adopted (applied).

From UE side, a control information on the PDCCH received in any search space set of a plurality of search space sets may have an indication to switch the group configuration in use. Upon the receipt of the control information or the indication on the PDCCH, the UE may switch the group configuration in use to the target group configuration for a group of search space sets. The control information or the indication on the PDCCH may include the group index of the target group configuration. In another embodiment, a scheduling DCI received in a search space set may have an indication to switch the group configuration in use. Upon receipt of the scheduling DCI or the indication in a search space set applied with a group configuration causing less PDCCH monitoring effort, the UE may automatically switch the group configuration in use to the target group configuration for a group of search space sets, in which the target group configuration may causing denser PDCCH monitoring effort.

In one embodiment, one group configuration with a specific group index (e.g., group configuration #0) may be the default group configuration. The default group configuration may be applied at the beginning of a DRX on-duration or at the beginning of active time. In another embodiment, the default group may be configured by the network (e.g., a NodeB).

To reduce the configuration overhead, for each search space set, there may be one group configuration assigned a group index but not configured (i.e., no values are defined or listed in the group configuration). Upon receiving the switching indication to switch to this unconfigured group configuration, the UE may skip or stop monitoring the PDCCH in associated search space sets during the DRX active time. In another embodiment, the UE may skip or stop monitoring the PDCCH in all the search space sets during the DRX active time.

For each search space set of a group of search space sets (on which the switching are uniformly performed), the number of group configurations might be different. In some embodiments, if a received indication is indicative of switching to a specific group configuration, and if this group configuration is not configured for some of the group search space sets, the UE may skip or stop monitoring the PDCCH in the search space sets for which this group configuration is not configured.

Figure 4:
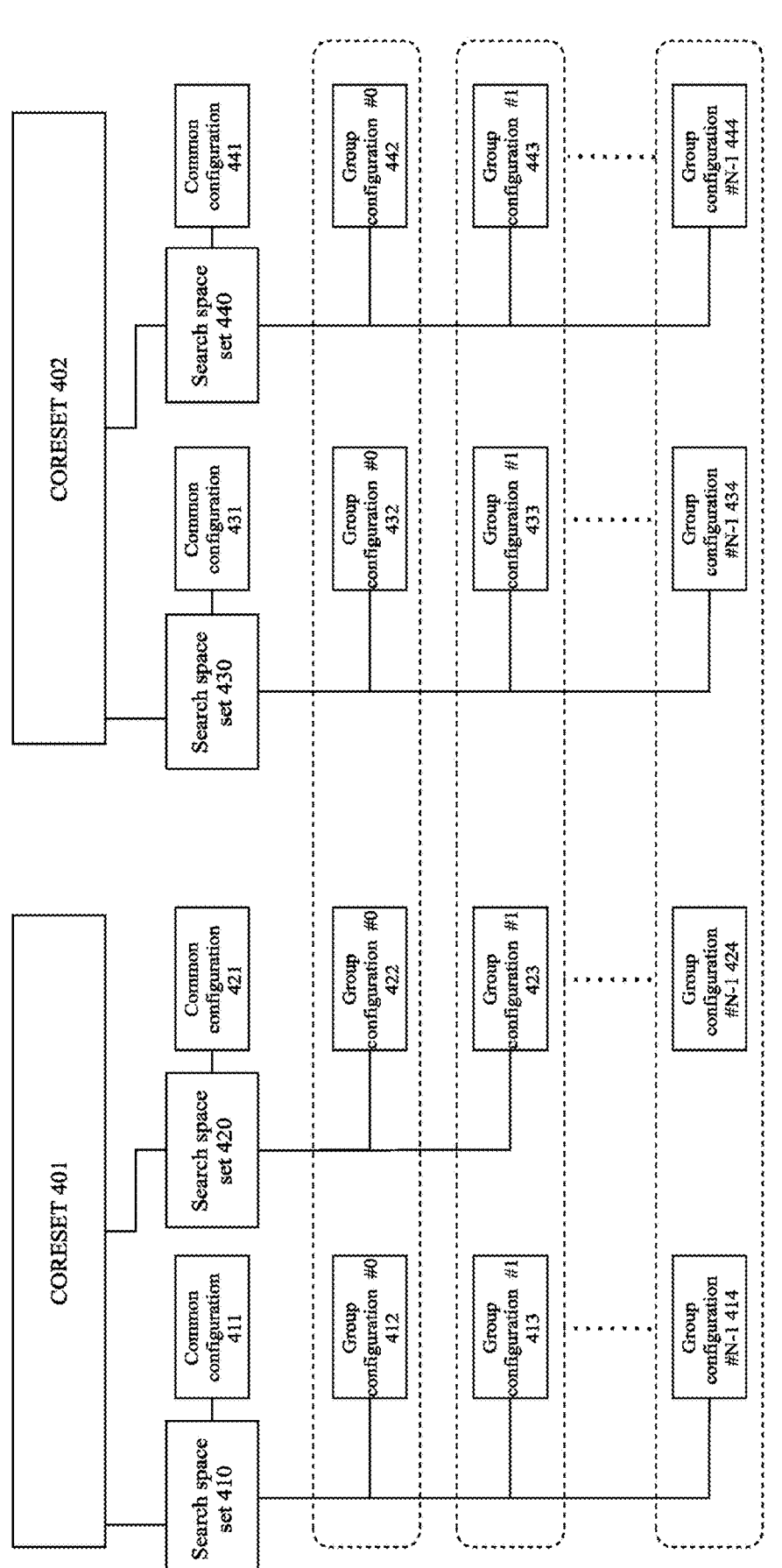
FIG. 4 is a schematic diagram illustrating search space sets including group configurations according to some embodiments of the present disclosure.

FIG. 4 is a schematic diagram illustrating search space sets 410, 420, 430, and 440 including group configurations according to some embodiments of the present disclosure.

In the embodiment of FIG. 4, CORESET 401 and CORE-SET 402 may be configured for a UE. Each of CORESET 401 and CORESET 402 may be associated with two search space sets. CORESET 401 may be associated with search space sets 410 and 420; CORESET 402 may be associated with search space sets 430 and 440. Each search space set may be associated with a configuration set. A configuration set may include a common configuration (for the common configuration fields) and N group configurations (from #0 to #N−1, each group configuration is for the group specific configuration fields). Each search space set may be associated with a common configuration (for the common configuration fields) and N group configurations (from #0 to #N−1, each group configuration is for the group specific configuration fields).

The common configurations for different search space sets may be different. The group configurations for different search space sets may be different. If two group configurations associated with two different search space sets are assigned the same group index (e.g., #0), these two group configuration with the same group index (e.g., #0) may be different. However, two group configurations associated with two different search space sets being assigned the same group index (e.g., #0) may indicate the same PDCCH monitoring level. For example, two group configurations associated with two different search space sets being assigned #1 may indicate a higher or denser monitoring level than that indicated by the two group configurations assigned #0. In another example, two group configurations associated with two different search space sets being assigned #2 may indicate a lower or sparser monitoring level than that indicated by the two group configurations assigned #0.

Search space set 410 may be configured with common configuration 411 and one of group configuration #0 412, group configuration #1 413, . . . , and group configuration #N−1 414. Search space set 420 may be configured with common configuration 421 and one of group configuration #0 422, group configuration #1 423, . . . , and group configuration #N−1 424. Search space set 430 may be configured with common configuration 431 and one of group configuration #0 432, group configuration #1 433, . . . , and group configuration #N−1 434. Search space set 440 may be configured with common configuration 441 and one of group configuration #0 442, group configuration #1 443, . . . , and group configuration #N−1 444.

In one embodiment of FIG. 4, the search space sets 410, 420, 430, and 440 may have uniform switching behavior. The uniform switching behavior of the search space sets 410, 420, 430, and 440 may be indicated by the rounded rectangles with dotted line in FIG. 4.

For example, it is assumed that the search space sets 410, 420, 430, and 440 are configured with group configuration #0. That is, the search space set 410 is configured with group configuration #0 412; the search space set 420 is configured with group configuration #0 422; the search space set 430 is configured with group configuration #0 432; and the search space set 440 is configured with group configuration #0 442. If a DCI is detected in search space set 410 indicating switching to group configuration #1, the UE may switch from group configuration #0 to group configuration #1 for all the four search space sets 410, 420, 430, and 440. After the switching, the search space set 410 is configured with group configuration #1 413; the search space set 420 is configured with group configuration #1 423; the search space set 430 is configured with group configuration #1 433; and the search space set 440 is configured with group configuration #1 443. The common configurations for the four search space sets 410, 420, 430, and 440 remain the same during the switching. That is, before and after switching, the search space set 410 is configured with common configuration 411; the search space set 420 is configured with common configuration 421; the search space set 430 is configured with common configuration 431; and the search space set 440 is configured with common configuration 441.

When all the search space sets have a consistent data traffic pattern, the switching behavior shown in the embodiment of FIG. 4 may reduce the times of switching and reduce the transmission times of indications. Furthermore, the control overhead is reduced. Thus, the switching behavior shown in the embodiment of FIG. 4 may reduce data transmission latency and increase data throughput.

Figure 5:
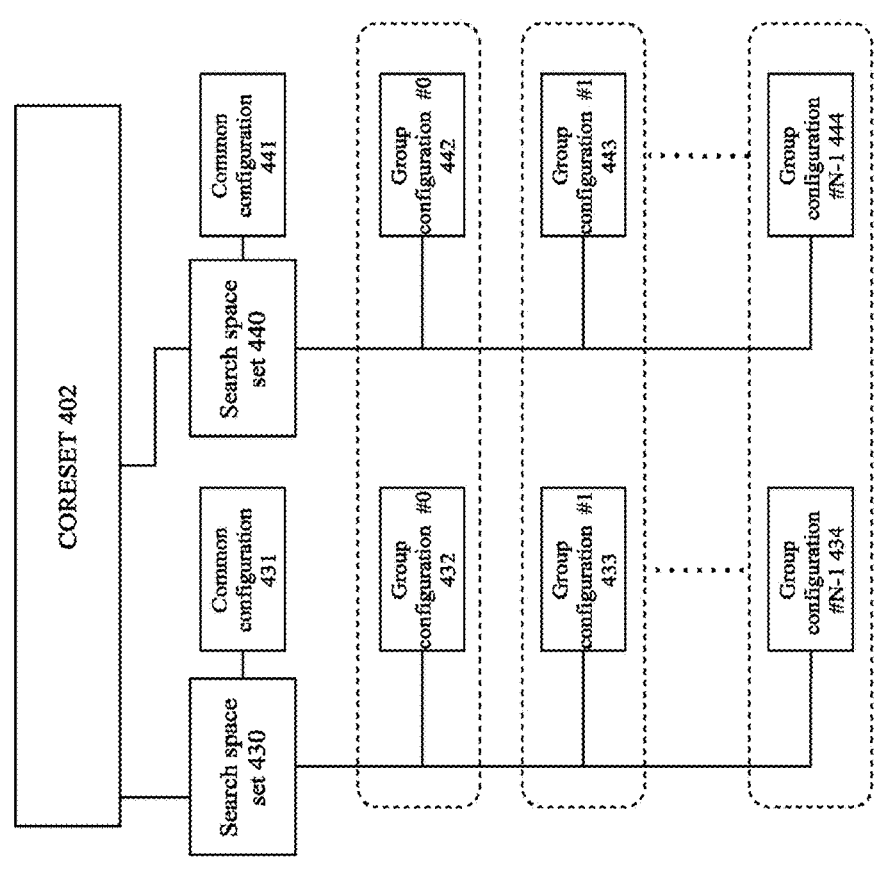
FIG. 5 is a schematic diagram illustrating search space sets including group configurations according to some embodiments of the present disclosure.
Figure 5:
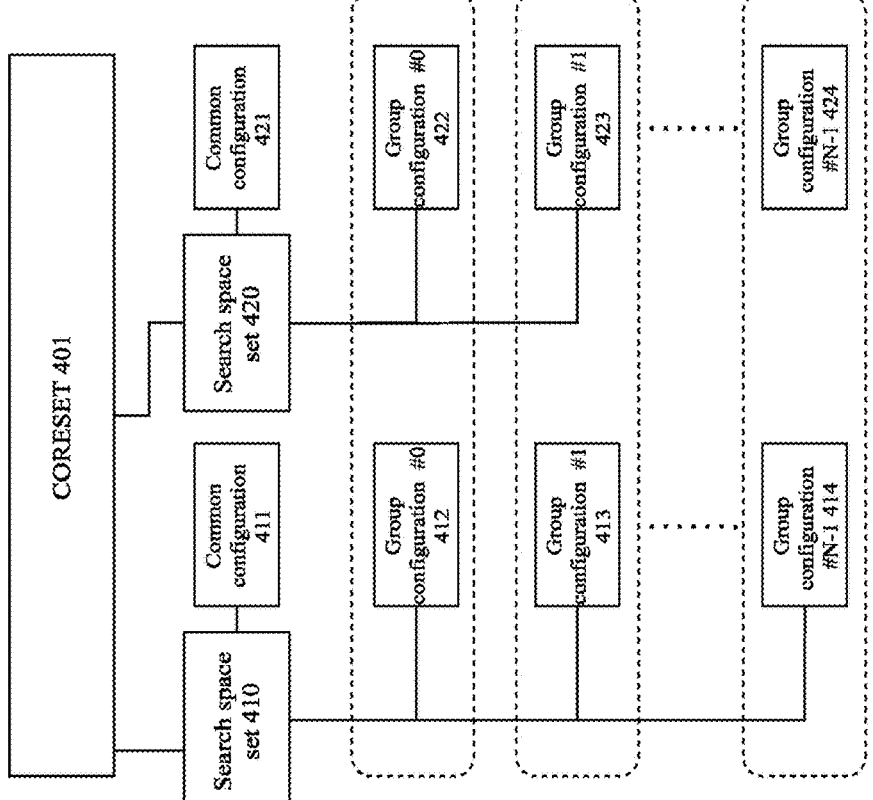

FIG. 5 is a schematic diagram illustrating search space sets 410, 420, 430, and 440 including group configurations according to some embodiments of the present disclosure. To simplify the explanation, the elements in FIGS. 4 and 5 shared with the same reference numerals may indicate identical or similar elements, parameters, values, fields, or functions.

In the embodiment of FIG. 5, CORESET 401 and CORESET 402 may be configured for a UE. Each of CORESET 401 and CORESET 402 may be associated with two search space sets. CORESET 401 may be associated with search space sets 410 and 420; CORESET 402 may be associated with search space sets 430 and 440. Each search space set may be associated with a configuration set. A configuration set may include a common configuration (for the common configuration fields) and N group configurations (from #0 to #N−1, each group configuration is for the group specific configuration fields). Each search space set may be associated with a common configuration (for the common configuration fields) and N group configurations (from #0 to #N−1, each group configuration is for the group specific configuration fields). Search space set 410 may be configured with common configuration 411 and one of group configuration #0 412, group configuration #1 413, . . . , and group configuration #N−1 414. Search space set 420 may be configured with common configuration 421 and one of group configuration #0 422, group configuration #1 423, . . . , and group configuration #N−1 424. Search space set 430 may be configured with common configuration 431 and one of group configuration #0 432, group configuration #1 433, . . . , and group configuration #N−1 434. Search space set 440 may be configured with common configuration 441 and one of group configuration #0 442, group configuration #1 443, . . . , and group configuration #N−1 444.

In one embodiment of FIG. 5, the search space sets associated with the same CORESET may have uniform switching behavior. For example, the search space sets 410 and 420 may have uniform switching behavior, and search space sets 430 and 440 may have uniform switching behavior. The switching behaviors of the search space sets 410 and 420 and of the search space sets 430 and 440 may be indicated by the rounded rectangles with dotted line in FIG. 5.

For example, it is assumed that the search space sets 410, 420, 430, and 440 are configured with group configuration #0. That is, the search space set 410 is configured with group configuration #0 412; the search space set 420 is configured with group configuration #0 422; the search space set 430 is configured with group configuration #0 432; and the search space set 440 is configured with group configuration #0 442. If a DCI is detected in search space set 410 indicating switching to group configuration #1, the UE may switch from group configuration #0 to group configuration #1 for all the search space sets 410 and 420 which are associated with the CORESET 401. The group configuration #1 for the search space sets 430 and 440 remain the same during the switching. After the switching, the search space set 410 is configured with group configuration #1 413; the search space set 420 is configured with group configuration #1 423; the search space set 430 is configured with group configuration #0 432; and the search space set 440 is configured with group configuration #0 442. The common configurations for the four search space sets 410, 420, 430, and 440 remain the same during the switching. That is, before and after switching, the search space set 410 is configured with common configuration 411; the search space set 420 is configured with common configuration 421; the search space set 430 is configured with common configuration 431; and the search space set 440 is configured with common configuration 441.

When the search space sets associated with different CORESET have inconsistent data traffic patterns, the switching behavior shown in the embodiment of Compared with FIG. 4, FIG. 5 may provide a more flexible switching behavior, and may further reduce redundant PDCCH monitoring effort and save UE power.

Figure 6:
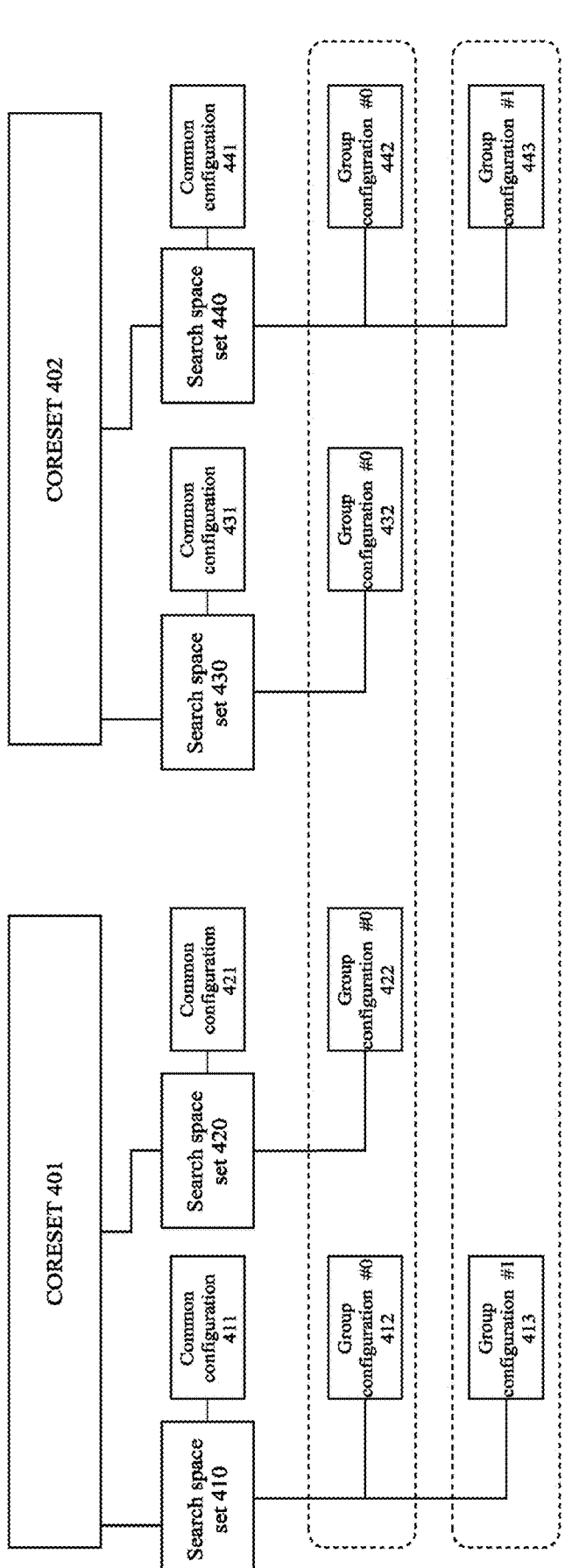
FIG. 6 is a schematic diagram illustrating search space sets including group configurations according to some embodiments of the present disclosure.

FIG. 6 is a schematic diagram illustrating search space sets 410, 420, 430, and 440 including group configurations according to some embodiments of the present disclosure. To simplify explanation, the elements in FIGS. 4 and 6 shared with the same reference numerals may indicate identical or similar elements, parameters, values, fields, or functions.

In the embodiment of FIG. 6, CORESET 401 and CORESET 402 may be configured for a UE. Each of CORESET 401 and CORESET 402 may be associated with two search space sets. CORESET 401 may be associated with search space sets 410 and 420; CORESET 402 may be associated with search space sets 430 and 440. Each search space set may be associated with a configuration set. A configuration set may include a common configuration (for the common configuration fields) and at least one group configuration (each group configuration is for the group specific configuration fields). Each search space set may be associated with a common configuration (for the common configuration fields) and at least one group configuration (each group configuration is for the group specific configuration fields). Search space set 410 may be configured with common configuration 411 and one of group configuration #0 412 and group configuration #1 413. Search space set 420 may be configured with common configuration 421 and group configuration #0 422. Search space set 430 may be configured with common configuration 431 and group configuration #0 432. Search space set 440 may be configured with common configuration 441 and one of group configuration #0 442 and group configuration #1 443.

Unlike the embodiment of FIG. 4, the numbers of group configurations for search space sets 410, 420, 430, and 440 in the embodiment of FIG. 6 are not identical. In the embodiment of FIG. 6, the search space sets 410 and 440 may include two group configurations (e.g., group configuration #0 412 and group configuration #1 413 for search space set 410; group configuration #0 442 and group configuration #1 443 for search space set 440). The search space sets 420 and 430 may include one group configuration (e.g., group configuration #0 422 for search space set 420; group configuration #0 432 for search space set 430).

For example, it is assumed that the search space sets 410, 420, 430, and 440 are configured with group configuration #0. That is, the search space set 410 is configured with group configuration #0 412; the search space set 420 is configured with group configuration #0 422; the search space set 430 is configured with group configuration #0 432; and the search space set 440 is configured with group configuration #0 442. If a DCI is detected in search space set 410 indicating switching to group configuration #1, the UE may switch from group configuration #0 to group configuration #1 for the search space sets 410 and 440. After the switching, the search space set 410 is configured with group configuration #1 413; and the search space set 440 is configured with group configuration #1 443. The common configurations for the four search space sets 410 and 440 remain the same during the switching. That is, before and after switching, the search space set 410 is configured with common configuration 411; and the search space set 440 is configured with common configuration 441. Because group configuration #1 is not configured for the search space sets 420 and 430, the UE may skip or stop monitoring the PDCCH in the search space sets 420 and 430 after the switching.

The switching behavior shown in the embodiment of FIG. 6 may be beneficial in terms of low search space configuration overhead and lower PDCCH monitoring effort.

Figure 7:
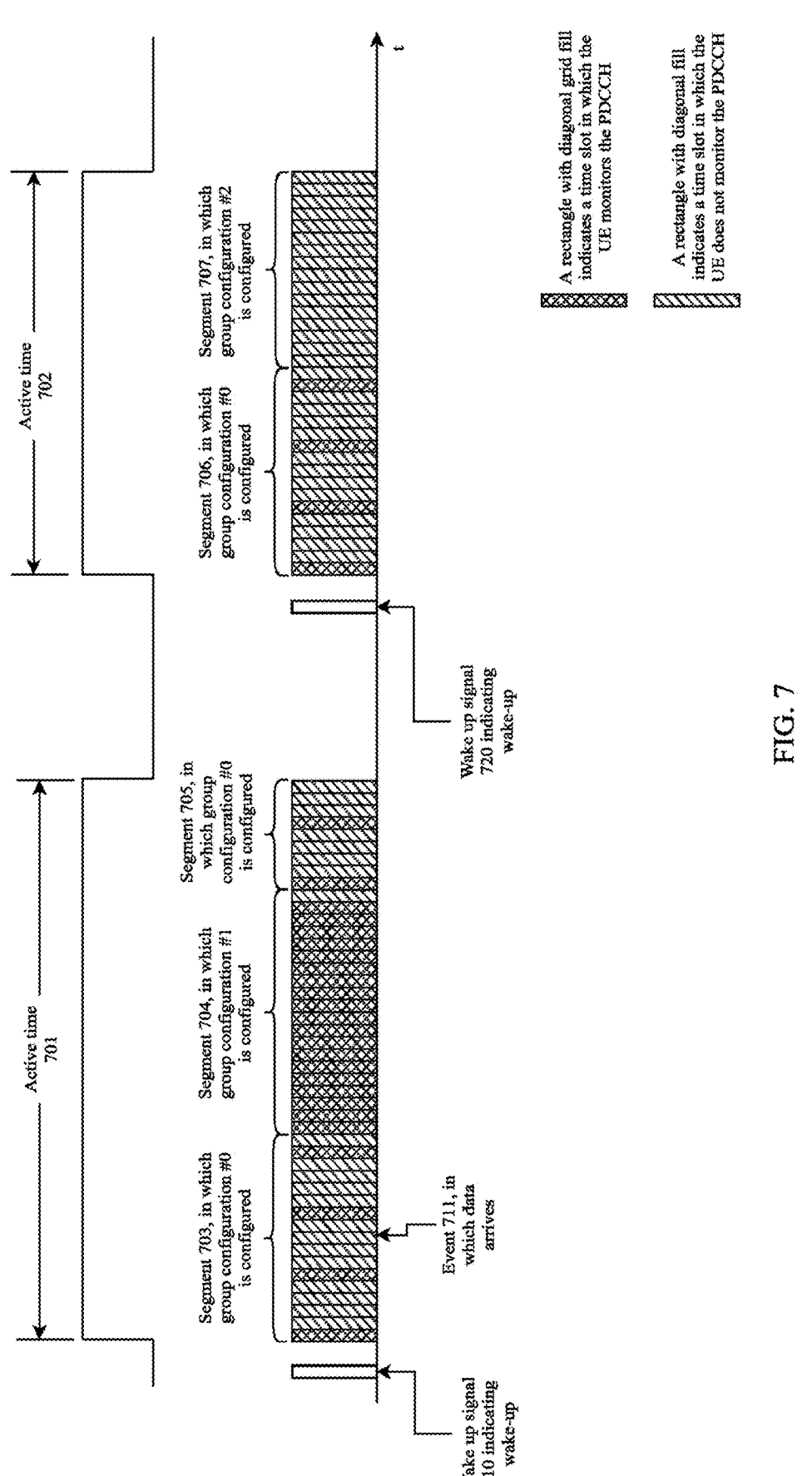
FIG. 7 is a schematic diagram illustrating a PDCCH monitoring scheme according to some embodiments of the present disclosure.

FIG. 7 is a schematic diagram illustrating a PDCCH monitoring scheme according to some embodiments of the present disclosure. In the embodiment of FIG. 7, a period of active time of a UE may be configured by different group configurations at different times. In FIG. 7, a rectangle with diagonal grid fill may indicate a time slot in which the UE monitors the PDCCH; a rectangle with diagonal fill may indicate a time slot in which the UE does not monitor the PDCCH.

The embodiment of FIG. 7 discloses an example of switching between different group configurations in the search space set based on the data traffic for a UE. In the embodiment of FIG. 7, the NodeB may transmit a WUS 710 indicative of wake-up to the UE, and the UE may enter active time 701 in response to the WUS 710. In some embodiments, the UE may enter active time 701 without receipt of the WUS 710. For example, the UE may enter active time 701 in response to receipt of an indication from the NodeB on the PDCCH (e.g., a scheduling DCI targeted for the UE).

In the active time 701, the UE may be configured with group configuration #0 for the corresponding search space sets at the beginning. Group configuration #0 may be a default group configuration. In the segment 703, the UE may be configured with group configuration #0 for the corresponding search space sets. Group configuration #0 may enable low PDCCH monitoring effort. During the segment 703 in which group configuration #0 is configured, the UE may monitor the PDCCH in the corresponding search space sets in sparse time slots.

In FIG. 7, an event 711 may occur during the segment 703. The event 711 may indicates that data packets targeted for the UE arrive. When the data arrives, the NodeB may transmit an indication to request the UE to switch to group configuration #1. The indication transmitted by the NodeB may be a scheduling DCI including a group index (i.e., #1). Upon receipt of indication from the NodeB, the UE may switch to group configuration #1. Upon receipt of indication from the NodeB, the UE may be configured with group configuration #1 for the corresponding search space sets. With respect to group configuration #0, group configuration #1 may result in denser PDCCH monitoring. In the segment 704, the UE may be configured with group configuration #1 for the corresponding search space sets. Group configuration #1 may enable higher PDCCH monitoring effort. During the segment 704 in which group configuration #1 is configured, the UE may monitor the PDCCH in the corresponding search space sets in denser time slots.

After the data transmission, the NodeB may transmit an indication to request the UE to switch (back) to group configuration #0. The indication transmitted by the NodeB may be a scheduling DCI including a group index (i.e., #0). Upon receipt of indication from the NodeB, the UE may switch to group configuration #0. Upon receipt of indication from the NodeB, the UE may be configured with group configuration #0 for the corresponding search space sets. During the segment 705 in which group configuration #0 is configured, the UE may monitor the PDCCH in the corresponding search space sets in sparse time slots.

In the embodiment of FIG. 7, the NodeB may transmit a WUS 720 indicative of wake-up to the UE, and the UE may enter active time 702 in response to the WUS 720. In some embodiments, the UE may enter active time 702 without receipt of the WUS 720. For example, the UE may enter active time 702 in response to receipt of an indication from the NodeB on the PDCCH (e.g., a scheduling DCI targeted for the UE).

In the active time 702, the UE may be configured with group configuration #0 for the corresponding search space sets at the beginning. Group configuration #0 may be a default group configuration. In the segment 706, the UE may be configured with group configuration #0 for the corresponding search space sets. Group configuration #0 may enable low PDCCH monitoring effort. During the segment 706 in which group configuration #0 is configured, the UE may monitor the PDCCH in the corresponding search space sets in sparse time slots.

If the NodeB decides not to schedule the UE in the active time 702, the NodeB may transmit an indication to request the UE to switch to group configuration #2. The indication transmitted by the NodeB may be a scheduling DCI including a group index (i.e., #2). Upon receipt of indication from the NodeB, the UE may switch to group configuration #2. Upon receipt of indication from the NodeB, the UE may be configured with group configuration #2 for the corresponding search space sets. During the segment 707 in which group configuration #2 is configured, the UE may skip, stop, or omit monitoring the PDCCH in the corresponding search space sets in all time slots. In some embodiments, during the segment 707 in which group configuration #2 is configured, the UE may skip, stop, or omit monitoring the PDCCH in all the corresponding search space sets.

Figure 8:
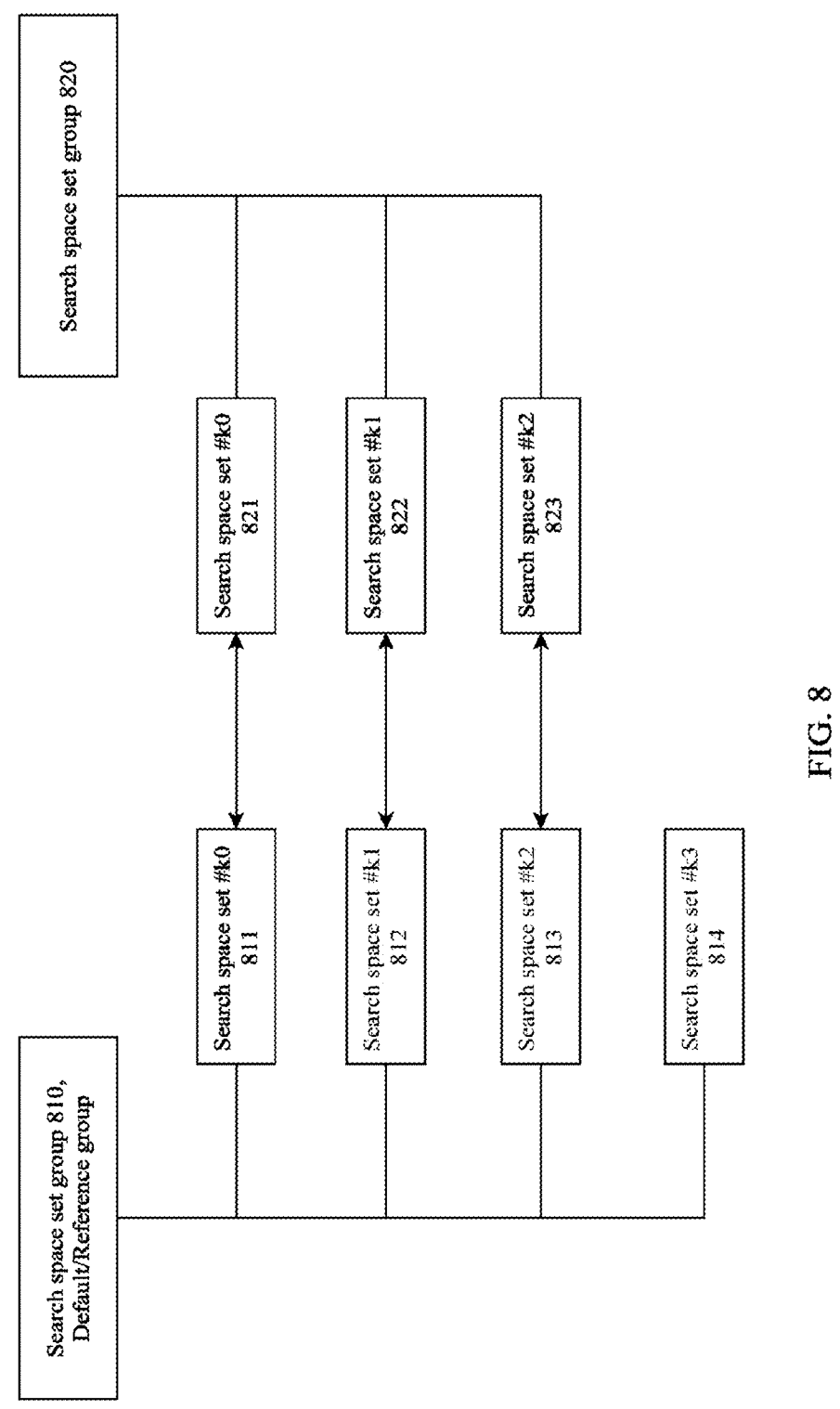
FIG. 8 is a schematic diagram illustrating switching between search space set groups according to some embodiments of the present disclosure.

FIG. 8 is a schematic diagram illustrating switching between search space set groups 810 and 820 according to some embodiments of the present disclosure.

In some embodiments, a UE may perform switching between two groups of search space sets. Referring to FIG. 8, switching may occur between search space set group 810 and search space set group 820. The search space set group 810 may indicate a certain level (e.g., high level) of PDCCH monitoring effort. The search space set group 820 may indicate another level (e.g., low level) of PDCCH monitoring effort.

The search space set group 810 may be a default search space set group or a reference search space set group. Any search space set in the search space set group 810 may be configured with configurations (or values) for a superset of the configuration fields. Any search space set in the search space set group 820 may be configured with configurations (or values) for a subset of the configuration fields. For two search space sets in different search space set groups, i.e., one in search space set group 810 and another in search space set group 820, but with same search space set ID, the configurations of the search space set in search space set group 820 follow the configurations of the search space set in search space set group 810, if these configurations are not configured for the search space set in search space group 820. For example, the configuration of CORESET ID might be included in the configurations of a search space set #k0 in search space set group 810, but is not included in the configuration of search space set #k0 in the search space set group 820. In this case, the CORESET ID of search space set #k0 in search space set group 820 follow the CORESET ID of search space set #k0 in search space set group 810.

The UE will switch from search space set group 810 to search space set 820 if there is a DCI received in any search space set from search space set group 810, and vice versa.

Figure 9:
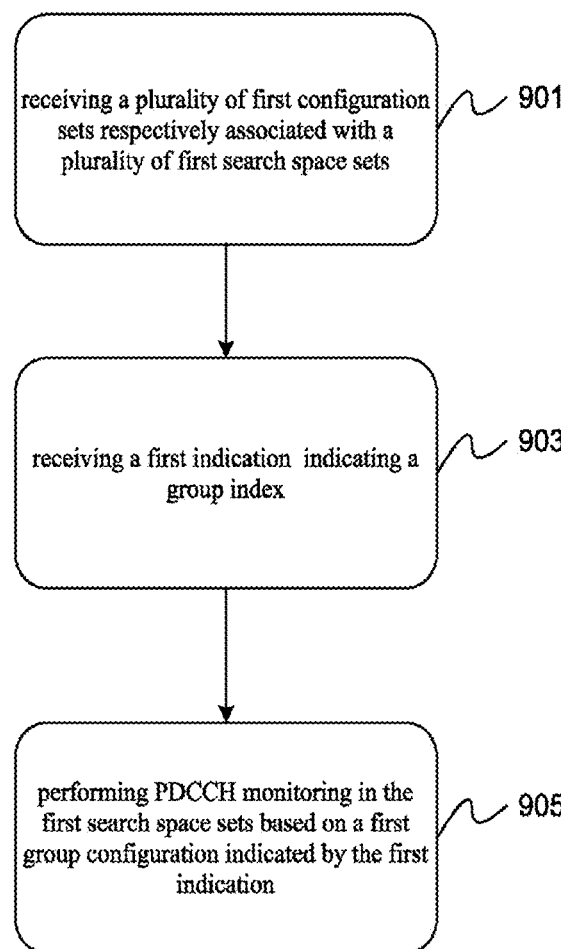
FIG. 9 is a flowchart of a method according to some embodiments of the present disclosure.

FIG. 9 is a flowchart of a method 900 according to some embodiments of the present disclosure. The method 900 may be performed by a UE. In some embodiments, the UE may be one of UEs 11 and 12.

In operation 901 of the exemplary method 900 shown in FIG. 9, the UE may receive a plurality of first configuration sets respectively associated with a plurality of first search space sets. The plurality of first configuration set may be transmitted by a NodeB. Each first configuration set may include a first common configuration and at least one first group configuration.

In operation 903, the UE may receive a first indication indicating a group index. In operation 905, the UE may perform PDCCH monitoring in the first search space sets based on a first group configuration indicated by the first indication.

In some embodiments of the method 900, the first common configuration may include a search space identifier (e.g., searchSpaceId), an associated CORESET identifier (e.g., controlResourceSetId), a staring symbol in slots configured for the PDCCH monitoring (e.g., monitoringSymbolsWithinSlot), and a search space type (e.g., serachSpaceType). Each of the at least one first group configuration may include periodicity and offset of slots for the PDCCH monitoring (e.g., monitoringSlotPeriodicityAndOffset), number of consecutive slots in a PDCCH monitoring periodicity (e.g., duration), and number of candidates per aggregation level (e.g., nrofCandidates).

In some embodiments of the method 900, the PDCCH monitoring in each of the first search space sets may be uniformly switched in response to the first indication.

In some embodiments of the method 900, the common configuration of each of the first search space sets may remain unchanged when the PDCCH monitoring in each of the first search space sets is uniformly switched.

In some embodiments of the method 900, the UE may receive a plurality of second configuration sets respectively associated with a plurality of second search space sets. The plurality of second configuration set may be transmitted by a NodeB. Each second configuration set may include a second common configuration and at least one second group configuration. Upon receipt of the first indication in the first space sets, the PDCCH monitoring in the second space sets may remain unchanged.

In some embodiments of the method 900, the first search space sets may include one of the following: (1) all UE specific search space sets; (2) all common search space sets; (3) all the UE specific search space sets and the common search space sets; (4) search space sets associated with a first control resource set (CORESET); (5) search space sets associated with a first CORESET pool; and (6) search space sets configured by a NodeB. The second search space sets may include one of the following: (1) all common search space sets; (2) all UE specific search space sets; (3) search space sets associated with a second CORESET different from a first CORESET; (4) search space sets associated with a second CORESET pool different from a first CORESET pool; and (5) search space sets configured by a NodeB other than the first search space sets.

In some embodiments of the method 900, when a field of the first configuration set is listed in both of the first common configuration and one of the at least one first group configuration, the corresponding field of the one of the at least one first group configuration set may be adopted.

In some embodiments of the method 900, in response to the first indication received in a first search space set is associated an unconfigured group configuration, the PDCCH monitoring in the first search space may be stopped.

In some embodiments of the method 900, in response to the first indication received in a first search space set is not associated with any group configuration, the PDCCH monitoring in the first search space may be stopped.

In some embodiments, the method 900 may further comprise entering active time in response to a wake up signal received by the UE. The first indication may be received during the active time.

In some embodiments, the method 900 may further comprise performing the PDCCH monitoring based on a default configuration selected from the at least one first group configuration at beginning of the active time.

In some embodiments, the method 900 may further comprise receiving a second indication after the first indication in the active time; and in response to the second indication, performing the PDCCH monitoring based on a group configuration associated with the second indication instead of the first indication.

Figure 10:
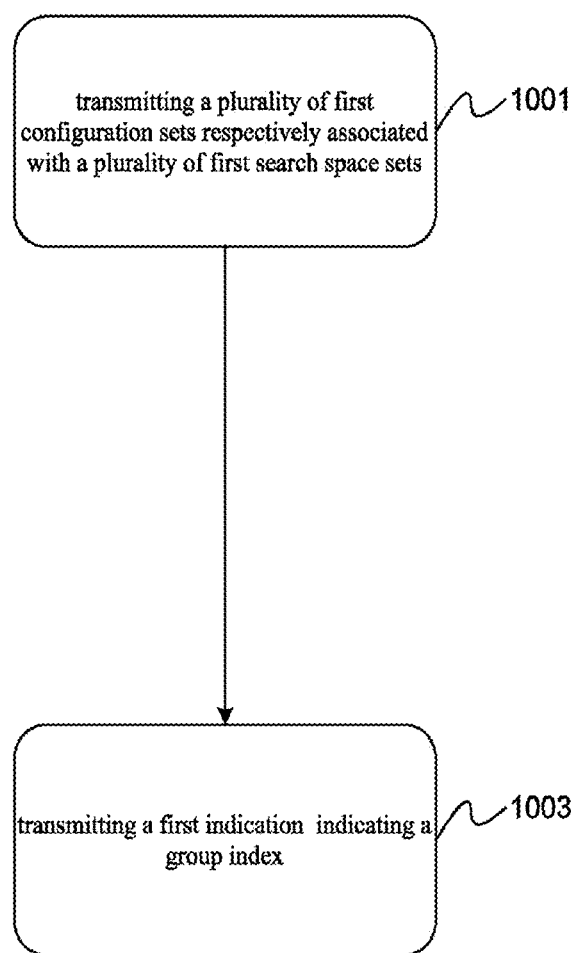
FIG. 10 is a flowchart of another method according to some embodiments of the present disclosure.

FIG. 10 is a flowchart of a method 1000 according to some embodiments of the present disclosure. The method 400 may be performed by a NodeB. In some embodiments, the NodeB may be the NodeB 10.

In operation 1001, the NodeB may transmit a plurality of first configuration sets respectively associated with a plurality of first search space sets. The plurality of first configuration set may be received by a UE. Each first configuration set may include a first common configuration and at least one first group configuration.

In operation 1003, the NodeB may transmit a first indication indicating a group index.

In some embodiments of the method 1000, the first common configuration may include a search space identifier (e.g., searchSpaceId), an associated CORESET identifier (e.g., controlResourceSetId), a staring symbol in slots configured for the PDCCH monitoring (e.g., monitoringSymbolsWithinSlot), and a search space type (e.g., serachSpaceType). Each of the at least one first group configuration includes periodicity and offset of slots for the PDCCH monitoring (e.g., monitoringSlotPeriodicityAndOffset), number of consecutive slots in a PDCCH monitoring periodicity (e.g., duration), and number of candidates per aggregation level (e.g., nrofCandidates).

In some embodiments, the method 1000 may further comprise: transmitting a plurality of second configuration sets respectively associated with a plurality of second search space sets. Each second configuration set may include a second common configuration and at least one second group configuration.

In some embodiments of the method 1000, the first search space sets may include one of the following: (1) all UE specific search space sets; (2) all common search space sets; (3) all the UE specific search space sets and the common search space sets; (4) search space sets associated with a first control resource set (CORESET); (5) search space sets associated with a first CORESET pool; and (6) search space sets configured by a NodeB. The second search space sets may include one of the following: (1) all common search space sets; (2) all UE specific search space sets; (3) search space sets associated with a second CORESET different from a first CORESET; (4) search space sets associated with a second CORESET pool different from a first CORESET pool; and (5) search space sets configured by a NodeB other than the first search space sets.

In some embodiments, the method 1000 may further comprise: transmitting a wake up signal before the first indication, wherein an UE enters active time upon receipt of the wake up signal.

In some embodiments, the method 1000 may further comprise: transmitting a second indication after the first indication.

Figure 11:
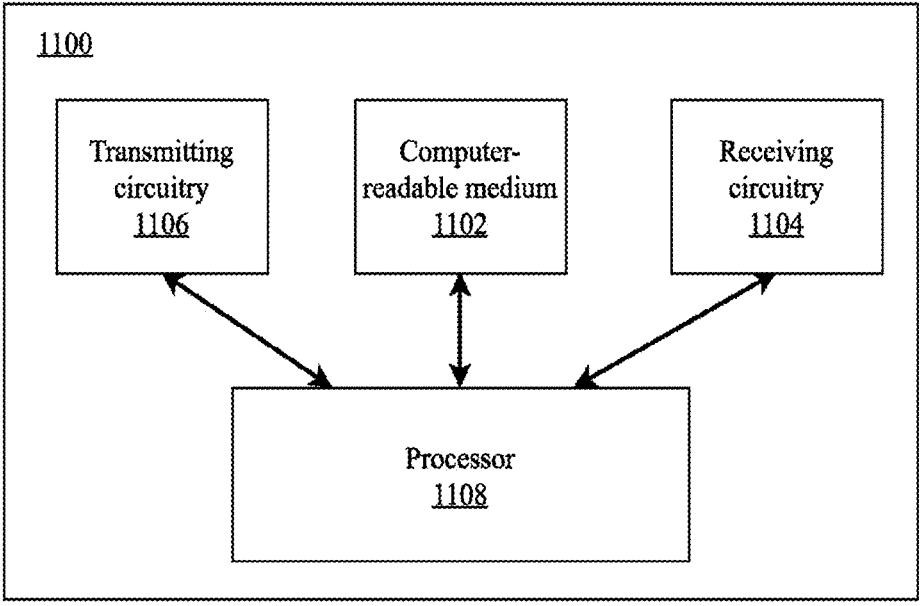
FIG. 11 is a simplified block diagram of an apparatus for communication according to some embodiments of the present disclosure.

FIG. 11 is a simplified block diagram of an apparatus 1100 according to some embodiments of the present disclosure. The apparatus 1100 may be the NodeB 10 or one of the UEs 11 and 12.

Referring to FIG. 11, the apparatus 1100 may include at least one non-transitory computer-readable medium 1102, at least one receiving circuitry 1104, at least one transmitting circuitry 1106, and at least one processor 1108. In some embodiments of the present disclosure, at least one receiving circuitry 1104 and at least one transmitting circuitry 1106 and may be integrated into at least one transceiver. The at least one non-transitory computer-readable medium 1102 may have computer executable instructions stored therein. The at least one processor 1108 may be coupled to the at least one non-transitory computer-readable medium 1102, the at least one receiving circuitry 1104, and the at least one transmitting circuitry 1106. The computer executable instructions can be programmed to implement a method with the at least one receiving circuitry 1104, the at least one transmitting circuitry 1106, and the at least one processor 1108. The method can be a method according to any embodiment of the present disclosure, for example, one of the methods shown in FIGS. 2 to 10.

Some embodiments of the present disclosure may be disclosed below:

Embodiment 1: A method performed by a user equipment (UE) for monitoring physical downlink control channels (PDCCHs), comprising:

receiving a plurality of first configuration sets respectively associated with a plurality of first search space sets, wherein each first configuration set includes a first common configuration and at least one first group configuration;

receiving a first indication indicating a group index; and performing PDCCH monitoring in the first search space sets based on a first group configuration indicated by the first indication.

Embodiment 2: The method of Embodiment 1, wherein:

the first common configuration includes a search space identifier, an associated CORESET identifier, a staring symbol in slots configured for the PDCCH monitoring, and a search space type; and each of the at least one first group configuration includes periodicity and offset of slots for the PDCCH monitoring, number of consecutive slots in a PDCCH monitoring periodicity, and number of candidates per aggregation level.

Embodiment 3: The method of Embodiment 1, wherein the PDCCH monitoring in each of the first search space sets is uniformly switched in response to the first indication.

Embodiment 4: The method of Embodiment 3, wherein the common configuration of each of the first search space sets remains unchanged when the PDCCH monitoring in each of the first search space sets is uniformly switched.

Embodiment 5: The method of Embodiment 1, further comprising:

receiving a plurality of second configuration sets respectively associated with a plurality of second search space sets, wherein each second configuration set includes a second common configuration and at least one second group configuration;

wherein, upon receipt of the first indication in the first space sets, the PDCCH monitoring in the second space sets remains unchanged.

Embodiment 6: The method of Embodiment 5, wherein the first search space sets include one of the following:

all UE specific search space sets;

all common search space sets;

all the UE specific search space sets and the common search space sets;

search space sets associated with a first control resource set (CORESET);

search space sets associated with a first CORESET pool; and search space sets configured by a NodeB.

Embodiment 7: The method of Embodiment 6, wherein the second search space sets include one of the following:

all common search space sets;

all UE specific search space sets;

search space sets associated with a second CORESET different from a first CORESET;

search space sets associated with a second CORESET pool different from a first CORESET pool; and search space sets configured by a NodeB other than the first search space sets.

Embodiment 8: The method of Embodiment 1, wherein:

when a field of the first configuration set is listed in both of the first common configuration and one of the at least one first group configuration, the corresponding field of the one of the at least one first group configuration set is adopted.

Embodiment 9: The method of Embodiment 1, wherein:

in response to the first indication received in a first search space set is associated an unconfigured group configuration, the PDCCH monitoring in the first search space is stopped.

Embodiment 10: The method of Embodiment 1, wherein:

in response to the first indication received in a first search space set is not associated with any group configuration, the PDCCH monitoring in the first search space is stopped.

Embodiment 11: The method of Embodiment 10, further comprising:

entering active time in response to a wake up signal received by the UE;

wherein the first indication is received during the active time.

Embodiment 12: The method of Embodiment 11, further comprising:

performing the PDCCH monitoring based on a default configuration selected from the at least one first group configuration at beginning of the active time.

Embodiment 13: The method of Embodiment 11, further comprising:

receiving a second indication after the first indication in the active time; and in response to the second indication, performing the PDCCH monitoring based on a group configuration associated with the second indication instead of the first indication.

Embodiment 14: A method performed by a NodeB and comprising:

transmitting a plurality of first configuration sets respectively associated with a plurality of first search space sets, wherein each first configuration set includes a first common configuration and at least one first group configuration; and transmitting a first indication indicating a group index.

Embodiment 15: The method of Embodiment 14, wherein:

the first common configuration includes a search space identifier, an associated CORESET identifier, a staring symbol in slots configured for the PDCCH monitoring, and a search space type; and each of the at least one first group configuration includes periodicity and offset of slots for the PDCCH monitoring, number of consecutive slots in a PDCCH monitoring periodicity, and number of candidates per aggregation level.

Embodiment 16: The method of Embodiment 14, further comprising:

transmitting a plurality of second configuration sets respectively associated with a plurality of second search space sets, wherein each second configuration set includes a second common configuration and at least one second group configuration.

Embodiment 17: The method of Embodiment 16, wherein the first search space sets include one of the following:

all UE specific search space sets;

all common search space sets;

all the UE specific search space sets and the common search space sets;

search space sets associated with a first control resource set (CORESET);

search space sets associated with a first CORESET pool; and search space sets configured by a NodeB.

Embodiment 18: The method of Embodiment 17, wherein the second search space sets include one of the following:

all common search space sets;

all UE specific search space sets;

search space sets associated with a second CORESET different from a first CORESET;

search space sets associated with a second CORESET pool different from a first CORESET pool; and search space sets configured by a NodeB other than the first search space sets.

Embodiment 19: The method of Embodiment 14, further comprising:

transmitting a wake up signal before the first indication, wherein an UE enters active time upon receipt of the wake up signal.

Embodiment 20: The method of Embodiment 14, further comprising:

transmitting a second indication after the first indication.

Embodiment 21: An apparatus, comprising:

at least one non-transitory computer-readable medium having computer executable instructions stored thereon;

at least one receiver;

at least one transmitter; and at least one processor coupled to the at least one non-transitory computer-readable medium, the at least one receiver, and the at least one transmitter;

wherein the computer executable instructions are programmed to implement a method according to any one of Embodiments 1-20 with the at least one receiver, the at least one transmitter, and the at least one processor.

The method according to embodiments of the present disclosure can also be implemented on a programmed processor. However, the controllers, flowcharts, and modules may also be implemented on a general purpose or special purpose computer, a programmed microprocessor or micro-controller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present disclosure provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present disclosure.

An alternative embodiment preferably implements the methods according to embodiments of the present disclosure in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present disclosure provides a non-transitory, computer-readable storage medium having computer programmable instructions stored therein. The computer programmable instructions are configured to implement a method for emotion recognition from speech as stated above or other method according to an embodiment of the present disclosure.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A method performed by a user equipment (UE) for monitoring physical downlink control channels (PDCCHs), the method comprising:

receiving first configuration sets respectively associated with first search space sets, each first configuration set including a first common configuration and at least one first group configuration;

receiving a first indication indicating a group index;

switching, in response to the first indication, PDCCH monitoring in each of the first search space sets uniformly, wherein the common configuration of each of the first search space sets remains unchanged; and performing the PDCCH monitoring in the first search space sets based on a first group configuration indicated by the first indication.

2. The method of claim 1, wherein:

the first common configuration includes a search space identifier, an associated control resource set (CORE-SET) identifier, a starting symbol in slots configured for the PDCCH monitoring, and a search space type; and each of the at least one first group configuration includes periodicity and offset of the slots for the PDCCH monitoring, a first number of consecutive slots in a PDCCH monitoring periodicity, and a second number of candidates per aggregation level.

3. The method of claim 1, further comprising:

receiving second configuration sets respectively associated with second search space sets, wherein each second configuration set includes a second common configuration and at least one second group configuration; and wherein, upon receipt of the first indication in the first space sets, the PDCCH monitoring in the second space sets remains unchanged.

4. The method of claim 1, wherein at least one of:

in response to the first indication received in a first search space set is associated with an unconfigured group configuration, the PDCCH monitoring in the first search space is stopped; or in response to the first indication received in the first search space set is not associated with any group configuration, the PDCCH monitoring in the first search space is stopped.

5. The method of claim 1, further comprising:

entering active time in response to a wake up signal received by the UE; and wherein the first indication is received during the active time.

6. The method of claim 5, further comprising:

performing the PDCCH monitoring based on a default configuration selected from the at least one first group configuration at a beginning of the active time.

7. The method of claim 5, further comprising:

receiving a second indication after the first indication in the active time; and in response to the second indication, performing the PDCCH monitoring based on a group configuration associated with the second indication instead of the first indication.

8. An apparatus for wireless communication, comprising:

at least one memory; and at least one processor coupled with the at least one memory and configured to cause the apparatus to:

transmit first configuration sets respectively associated with first search space sets, each first configuration set including a first common configuration and at least one first group configuration; and transmit a first indication indicating a group index, wherein each of the first search space sets is uniformly switched in response to the first indication, and the common configuration of each of the first search space sets remains unchanged.

9. The apparatus of claim 8, wherein the at least one processor is configured to cause the apparatus to transmit second configuration sets respectively associated with a second search space sets, wherein each second configuration set includes a second common configuration and at least one second group configuration.

10. The apparatus of claim 8, wherein the at least one processor is configured to cause the apparatus to transmit second configuration sets respectively associated with second search space sets, wherein each second configuration set includes a second common configuration and at least one second group configuration.

11. An apparatus for wireless communication, comprising:

at least one memory; and at least one processor coupled with the at least one memory and configured to cause the apparatus to:

receive first configuration sets respectively associated with first search space sets, each first configuration set including a first common configuration and at least one first group configuration;

receive a first indication indicating a group index;

switch, in response to the first indication, physical downlink control channel (PDCCH) monitoring in each of the first search space sets uniformly, wherein the common configuration of each of the first search space sets remains unchanged; and perform the PDCCH monitoring in the first search space sets based on a first group configuration indicated by the first indication.

12. The apparatus of claim 11, wherein:

the first common configuration includes a search space identifier, an associated control resource set (CORESET) identifier, a starting symbol in slots configured for the PDCCH monitoring, and a search space type; and each of the at least one first group configuration includes periodicity and offset of the slots for the PDCCH monitoring, a first number of consecutive slots in a PDCCH monitoring periodicity, and a second number of candidates per aggregation level.

13. The apparatus of claim 11, wherein the at least one processor is configured to cause the apparatus to:

receive second configuration sets respectively associated with second search space sets, each second configuration set including a second common configuration and at least one second group configuration; and wherein, upon receipt of the first indication in the first space sets, the PDCCH monitoring in the second space sets remains unchanged.

14. The apparatus of claim 11, wherein at least one of:

in response to the first indication received in a first search space set is associated with an unconfigured group configuration, the PDCCH monitoring in the first search space is stopped; or in response to the first indication received in the first search space set is not associated with any group configuration, the PDCCH monitoring in the first search space is stopped.

15. The apparatus of claim 11, wherein the processor is configured to cause the apparatus to:

enter active time in response to a wake up signal received by a user equipment; and wherein the first indication is received during the active time.

16. The apparatus of claim 15, wherein the at least one processor is configured to cause the apparatus to perform the PDCCH monitoring based on a default configuration selected from the at least one first group configuration at a beginning of the active time.

17. The apparatus of claim 15, wherein the at least one processor is configured to cause the apparatus to:

receive a second indication after the first indication in the active time; and in response to the second indication, perform the PDCCH monitoring based on a group configuration associated with the second indication instead of the first indication.

18. A method performed by a base station, the method comprising:

transmitting first configuration sets respectively associated with first search space sets, each first configuration set including a first common configuration and at least one first group configuration; and transmitting a first indication indicating a group index, wherein each of the first search space sets is uniformly switched in response to the first indication, and the common configuration of each of the first search space sets remains unchanged.

19. The method of claim 18, wherein the first common configuration includes a search space identifier, an associated control resource set (CORESET) identifier, and a search space type.

20. The method of claim 18, further comprising:

transmitting second configuration sets respectively associated with second search space sets, wherein each second configuration set includes a second common configuration and at least one second group configuration.

* * * * *